(12) United States Patent
de Ojeda et al.

(10) Patent No.: US 9,322,339 B2
(45) Date of Patent: Apr. 26, 2016

(54) INTERNAL COMBUSTION ENGINE OPERATING ON DIFFERENT REACTIVITY FUELS

(75) Inventors: William de Ojeda, Oak Park, IL (US); Ming Zheng, Windsor (CA)

(73) Assignee: International Engine Intellectual Property Company, LLC., Lisle, IL (US)

( * ) Notice: Subject to any disclaimer, the term of this patent is extended or adjusted under 35 U.S.C. 154(b) by 6 days.

(21) Appl. No.: 14/372,490

(22) PCT Filed: Jan. 19, 2012

(86) PCT No.: PCT/US2012/021791
§ 371 (c)(1),
(2), (4) Date: Jul. 16, 2014

(87) PCT Pub. No.: WO2013/109270
PCT Pub. Date: Jul. 25, 2013

(65) Prior Publication Data
US 2014/0358405 A1    Dec. 4, 2014

(51) Int. Cl.
*F02B 1/00* (2006.01)
*F02D 19/08* (2006.01)
*F02B 23/04* (2006.01)
*F02B 23/06* (2006.01)
*F02D 19/06* (2006.01)
*F02D 41/00* (2006.01)
(Continued)

(52) U.S. Cl.
CPC ............... *F02D 19/08* (2013.01); *F02B 23/04* (2013.01); *F02B 23/0684* (2013.01); *F02B 23/0687* (2013.01); *F02B 23/0696* (2013.01); *F02D 19/0649* (2013.01); *F02D 19/0689* (2013.01); *F02D 19/0692* (2013.01); *F02D 19/081* (2013.01); *F02D 41/0025* (2013.01); *F02D 41/3094* (2013.01); *F02B 1/12* (2013.01); *F02D 41/3035* (2013.01); *F02M 25/0707* (2013.01); *F02M 25/0727* (2013.01); *Y02T 10/125* (2013.01); *Y02T 10/128* (2013.01); *Y02T 10/36* (2013.01)

(58) Field of Classification Search
CPC ..... F02D 41/3094; F02D 41/32; F02D 41/34; F02B 3/06
USPC .......... 123/429, 430, 431, 294, 295, 301–305
See application file for complete search history.

(56) References Cited

U.S. PATENT DOCUMENTS

| | | | | |
|---|---|---|---|---|
| 7,712,451 B2 * | 5/2010 | Hung | .................... | F02B 17/005 123/431 |
| 8,997,714 B2 * | 4/2015 | Rumpsa | ............. | F02M 63/0265 123/305 |

(Continued)

*Primary Examiner* — John Kwon
(74) *Attorney, Agent, or Firm* — Jack D. Nimz; Jeffrey P. Calfa

(57) ABSTRACT

A premixed charge of air and a low reactivity fuel is created in a combustion chamber space by the time at which a piston comes substantially to top dead center at which time a high reactivity fuel is directly injected into a central zone of the combustion chamber space which is bounded partially by a central bowl cavity in the piston head which is itself surrounded by an upright intermediate wall. The high reactivity fuel combusts by conventional diesel combustion and creates a flame front which propagates into an outer zone of the combustion chamber space which is bounded partially by the upright intermediate wall and an outer bowl cavity in the piston head to initiate combustion of the premixed air-fuel charge in the outer zone of the combustion chamber space.

4 Claims, 4 Drawing Sheets

(51) Int. Cl.
*F02B 1/12* (2006.01)
*F02M 25/07* (2006.01)
*F02D 41/30* (2006.01)

(56) References Cited

U.S. PATENT DOCUMENTS

| | | | | |
|---|---|---|---|---|
| 2006/0185643 A1* | 8/2006 | Lee | ............... | F02B 75/282 123/295 |
| 2006/0219215 A1* | 10/2006 | Brachert | ............ | F02B 23/104 123/299 |
| 2008/0210198 A1* | 9/2008 | Yamada | ............... | F02B 23/101 123/431 |
| 2011/0094473 A1* | 4/2011 | Goto | ............... | F02B 23/104 123/302 |
| 2012/0085316 A1* | 4/2012 | Chen | ............... | F02M 61/1826 123/298 |
| 2012/0186555 A1* | 7/2012 | Mueller | ............ | F02B 3/00 123/294 |
| 2014/0305103 A1* | 10/2014 | Nakagawa | ........ | F02D 41/1441 60/286 |

* cited by examiner

INTERNAL COMBUSTION ENGINE OPERATING ON DIFFERENT REACTIVITY FUELS

FIELD

The subject matter of this disclosure relates to internal combustion engines, especially engines which operate on fuels which have different reactivities.

BACKGROUND

Homogeneous Charge Compression Ignition (HCCI) and Premixed Charge Compression Ignition (PCCI) are known processes for fueling a compression ignition (i.e., diesel) engine in a manner which creates an air-fuel charge inside an engine cylinder during a compression upstroke of an engine cycle. After creation of the charge, the increasing compression of the charge by the upstroking piston creates sufficiently high temperature to cause auto-ignition of the charge. The fuel which is used to create the charge may comprise a mixture of different reactivity fuels. Gasoline, natural gas, and ethanol are examples of low reactivity fuels while conventional diesel fuel is an example of a high reactivity fuel.

The HCCI mode of operation of a diesel engine is significantly affected by chemical kinetics, thwarting the ability of even the best controls and devices, which are capable of injecting fuel at different injection pressures, at different times, and for different durations during an engine cycle, to properly control combustion events in ways that would enable engine performance and emission targets to be met over the full operating range of the engine.

PCCI is similar to HCCI in that fuel is premixed with air but the resulting mixture is less homogeneous. Stratified Charge Combustion Ignition (SCCI) is another similar type of combustion but is premised on some degree of stratification of a premixed charge.

SUMMARY OF THE DISCLOSURE

The disclosed engine comprises a number of variable volume combustion chamber spaces each of which is cooperatively defined by a piston and an engine cylinder within which the piston reciprocates. As the piston moves inward, the combustion chamber space decreases in volume. As the piston moves outward, the combustion chamber space increases in volume. When the combustion chamber space closely approaches and finally attains its minimum volume, i.e. approaches and arrives at top dead center (TDC), the cooperation between confronting surfaces of the piston and the engine cylinder forms what is referred to as a "dual chamber" bowl.

The dual chamber bowl comprises a circular central bowl cavity which is radially bounded by a circular upright intermediate wall and an annular outer bowl cavity which is bounded radially inwardly by the upright intermediate wall and radially outwardly by a circular upright outer wall. The word "upright" is to be understood as meaning upright relative to the deepest surface of the cavity which the wall surrounds.

The upright intermediate wall is effective to enable combustion to occur in two distinct modes, a first of which is a high reactivity combustion mode caused by combustion of high reactivity fuel (such as diesel) directly injected into a central zone of the combustion chamber space which is bounded partially by the central bowl cavity when the piston is substantially at TDC and a second of which is an alternative form of combustion such as HCCI, PCCI, or SCCI caused by the flame front of the combusting high reactivity fuel igniting a charge of air and low reactivity fuel, which has been premixed either by direct injection during a compression upstroke and/or by port injection, in an outer zone of the combustion chamber space which is partially bounded by the outer bowl cavity.

Direct injection can commence well in advance of ignition of the premixed charge, typically at or near bottom dead center (BDC).

Because the combustion of low reactivity fuel is a combustion mode initiated by a high reactivity combustion mode such as the conventional diesel combustion mode, or a similar mode sometimes referred to as an enhanced premixed combustion mode, the low reactivity combustion mode commences later than the commencement of the high reactivity combustion mode. By controlling both the quantity of low reactivity fuel and the quantity of recirculated engine exhaust in the premixed charge, and by controlling the timing of injection of the high reactivity fuel, timing of combustion of the premixed charge can be controlled to occur at or slightly after TDC and consequently limit the pressure rise which characterizes combustion of the premixed charge to an appropriate magnitude.

The two distinct combustion modes can reduce the quantity of engine exhaust which is recirculated, thereby allowing the premixed charge to have a greater percentage of oxygen. The ability to control pressure rise in relation to engine crank angle can extend engine load range, which otherwise might be limited by pressure rise as fueling is increased. Moreover, a reduction in recirculated engine exhaust can reduce the magnitude of boost needed if an engine is supercharged, such as by a turbocharger. Reduction in boost also reduces engine back-pressure, resulting in more efficient engine operation.

One generic aspect of the presently disclosed subject matter relates to an internal combustion engine which comprises an engine cylinder, a piston which reciprocates within the engine cylinder and cooperates with the engine cylinder to form a combustion chamber space whose volume decreases as the piston moves inward within the engine cylinder and increases as the piston moves outward within the engine cylinder.

The piston and the engine cylinder comprise confronting surfaces which, when the combustion chamber space closely approaches and finally attains minimum volume, cooperatively define a central bowl cavity which is radially bounded by an upright intermediate wall and an annular outer bowl cavity radially outward of the upright intermediate wall.

An intake system introduces air into the combustion chamber space.

A first injector injects low reactivity fuel into the air to create within the combustion chamber space, a premixed air-fuel charge.

When the combustion chamber space has substantially attained minimum volume, high reactivity fuel is directly injected into a central zone of the combustion chamber space which is bounded partially by the central bowl cavity and the upright intermediate wall where the injected fuel combusts to create a flame front which propagates into an outer zone of the combustion chamber space which is bounded partially by the upright intermediate wall and the outer bowl cavity to initiate combustion of the premixed air-fuel charge in the outer zone of the combustion chamber space.

A further generic aspect relates to a method of operating an internal combustion engine which has an engine cylinder, a piston which reciprocates within the engine cylinder and cooperates with the engine cylinder to form a combustion chamber space whose volume decreases as the piston moves inward within the engine cylinder and increases as the piston moves outward within the engine cylinder, the piston and the engine cylinder comprising confronting surfaces which, when the combustion chamber space closely approaches and finally attains minimum volume, cooperatively define a central bowl cavity which is radially bounded by an upright intermediate wall and an annular outer bowl cavity radially outward of the upright intermediate wall, and an intake system for introducing air into the combustion chamber space.

The method comprises injecting low reactivity fuel into the air to create within the combustion chamber space, a premixed air-fuel charge. When the combustion chamber space has substantially attained minimum volume, a high reactivity fuel is directly injected into a central zone of the combustion chamber space which is bounded partially by the central bowl cavity and the upright intermediate wall and combusts to create a flame front which propagates into an outer zone of the combustion chamber space which is bounded partially by the upright intermediate wall and the outer bowl cavity to initiate combustion of the premixed air-fuel charge in the outer zone of the combustion chamber space.

The foregoing summary is accompanied by further detail of the disclosure presented in the Detailed Description below with reference to the following drawings which are part of the disclosure.

DESCRIPTION OF THE PREFERRED EMBODIMENT

Figure 1:
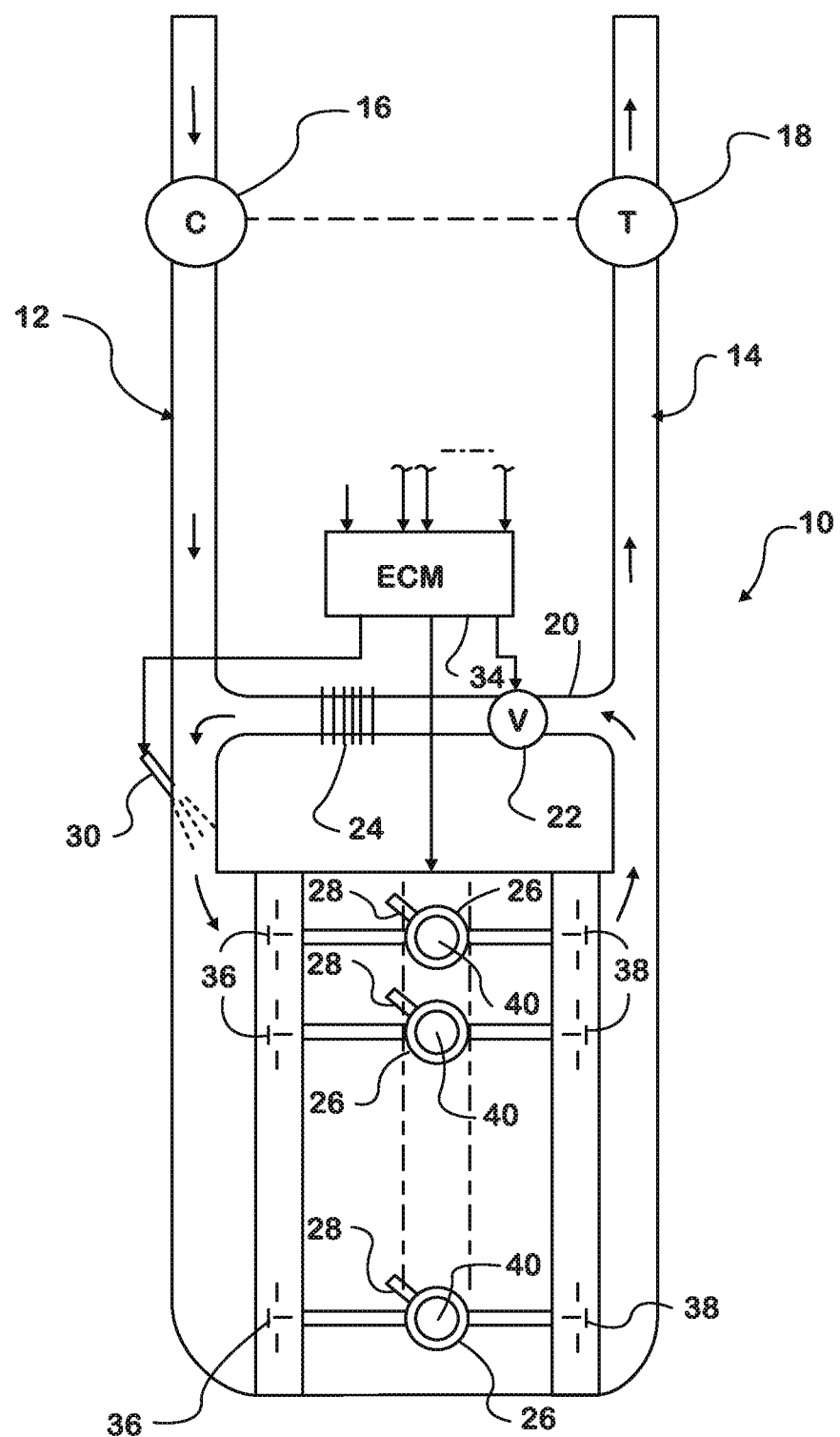
FIG. 1 is a schematic portrayal of an engine showing portions relevant to the present disclosure.

FIG. 1 shows an internal combustion engine 10 including an intake system 12 for delivering charge air to engine combustion chamber spaces and an exhaust system 14 for conveying engine exhaust from the combustion chamber spaces to atmosphere. Engine 10 is supercharged by a turbocharger which has a compressor 16 in intake system 12 and a turbine 18 in exhaust system 14. An exhaust gas recirculation (EGR) system 20, shown to comprise an EGR valve 22 and an EGR cooler 24, provides controlled recirculation of engine exhaust from exhaust system 14 to intake system 12. Other components which may be present in intake and/or exhaust systems of contemporary engines, such as exhaust treatment devices in exhaust systems, are not shown.

Engine 10 operates on the principle of in-cylinder compression ignition, an alternative to spark ignition, and ensuing use of a flame front which propagates from the compression ignition to ignite a premixed air-fuel charge which although compressed, does not auto-ignite. When engine 10 is used as the prime mover of a motor vehicle such as a truck (not shown in the drawing), a rotary output of engine 10 is coupled through a drivetrain to road-engaging drive wheels for propelling the vehicle.

Engine 10 comprises multiple engine cylinders 26 (either in an in-line configuration or a V-configuration) forming the combustion chamber spaces within which combustion of fuel occurs in a manner hereinafter described. A direct injector 28 is arranged at each engine cylinder 26 to inject fuel directly into the combustion chamber space. A port injector 30 is arranged to inject fuel into intake system 12 before the air enters the combustion chamber spaces.

Engine 10 further comprises an engine control module (ECM) 34, cylinder intake valves 36, and cylinder exhaust valves 38. ECM 34 controls various devices, including direct injectors 28, port injector 30, and EGR valve 22. Cylinder intake valves 36 control admission of intake flow into the combustion chamber spaces, and cylinder exhaust valves 38 control admission of engine exhaust from the combustion chamber spaces into exhaust system 14.

Recirculated exhaust entrains with fresh intake air upstream of the location at which port injector 30 injects fuel into intake system 12. When a cylinder intake valve 36 of a respective engine cylinder 26 opens, a mixture comprising a low reactivity fuel injected by port injector 30, fresh air, and exhaust enters the combustion chamber space. When the cylinder intake valve closes, the mixture is trapped and subsequently compressed by an upstroking piston 40. By the time that it combusts, the mixture has been premixed. When cylinder exhaust valve 38 of a respective engine cylinder 26 opens, "engine out" exhaust leaves the combustion chamber space.

Figure 2:
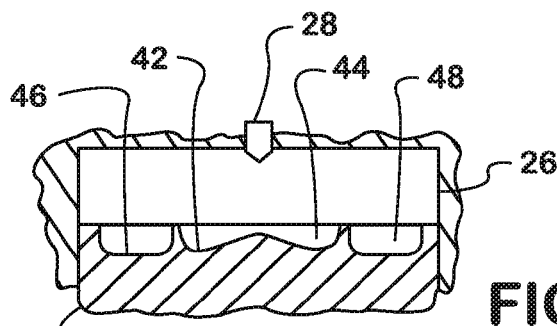
FIGS. 2 through 6 are a succession of views of an engine combustion chamber depicting a sequence of events during an engine cycle for illustrating the two modes of the disclosed combustion process.

FIG. 2 shows a cross section through a representative engine cylinder 26 within which a piston 40 reciprocates. As piston 40 moves outward within engine cylinder 26, the combustion chamber space increases in volume. As piston 40 moves inward within engine cylinder 26, the combustion chamber space decreases in volume.

Piston 40 comprises a head whose surface has features which cooperate with a confronting surface of the engine cylinder to form the "dual chamber" bowl of the combustion chamber space in the manner described earlier.

Each piston 40 is coupled by a respective rod (not shown) to an engine crankshaft (not shown) so that as combustion occurs within the combustion chamber space, the crankshaft is rotated to deliver torque through the rotary output of the engine and the drivetrain to the drive wheels that propel the vehicle. The dual chamber bowl comprises a circular central bowl cavity 42, which is radially bounded by a circular upright intermediate wall 44, and an annular outer bowl cavity 46 which is bounded radially inwardly by upright intermediate wall 44 and radially outwardly by a circular upright outer wall 48. Upright intermediate wall 44 and upright outer wall 48 lie on respective concentric circles, and their upper ends lie on a common plane which is perpendicular to the direction of reciprocation of piston 40.

Upright intermediate wall 44 enables combustion to occur in two distinct modes, a first of which is a high reactivity combustion mode caused by combustion of high reactivity (diesel) fuel directly injected by direct injector 28 into a central zone of the combustion chamber space which is bounded partially by central bowl cavity 42 when piston 40 is substantially at top dead center (TDC), i.e. when the volume of the combustion chamber space is substantially at its minimum. This is portrayed by FIGS. 3 and 4 which depict "snapshots" taken at slightly different times.

Figure 3:
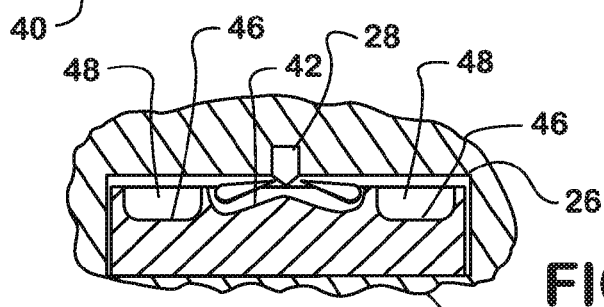
Figure 4:
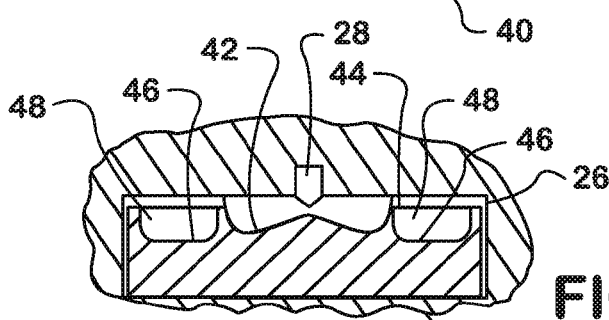

FIG. 3 illustrates the start of injection and combustion. FIG. 4 shows the progression of combustion with upright intermediate wall 44 providing a significant degree of temporary containment of the expansion. Central bowl cavity 42 comprises a conically domed surface which is bounded by upright intermediate wall 44 and which has an apex below an upper end of upright intermediate wall 44. This shape cooperates with upright intermediate wall 44 in allowing the injection to progress while providing significant containment as the combustion expands.

Figure 5:
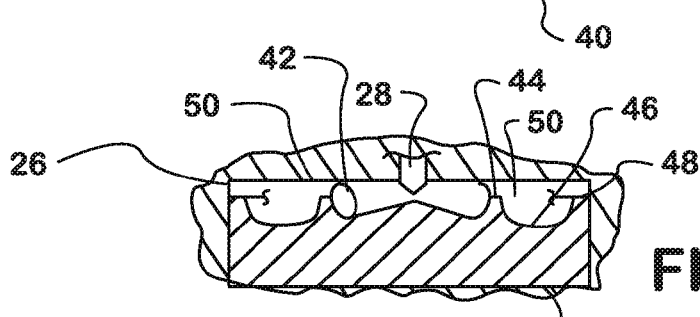

The second distinct mode is a combustion mode caused by the flame front 50 of the combusting high reactivity fuel igniting the premixed charge of air and low reactivity fuel in an outer zone of the combustion chamber space which is partially bounded by outer bowl cavity 46 and upright outer wall 48. This is depicted by FIG. 5.

Because the second combustion mode is initiated by the high reactivity combustion mode, the second mode commences later than the commencement of the high reactivity combustion mode. By controlling both the quantity of low reactivity fuel and the quantity of recirculated engine exhaust in the premixed air-fuel charge, and by controlling the timing of injection of the high reactivity fuel, timing of combustion of the premixed air-fuel charge can be controlled to occur at or slightly after TDC and consequently limit the pressure rise which characterizes combustion of the premixed air-fuel charge to a magnitude which can be tolerated by the engine structure. Diesel combustion is highly efficient and only enough diesel fuel need be injected to assure ensuing combustion of the premixed air-fuel charge, thereby limiting the creation of undesired products of combustion in "engine out" exhaust.

Figure 6:
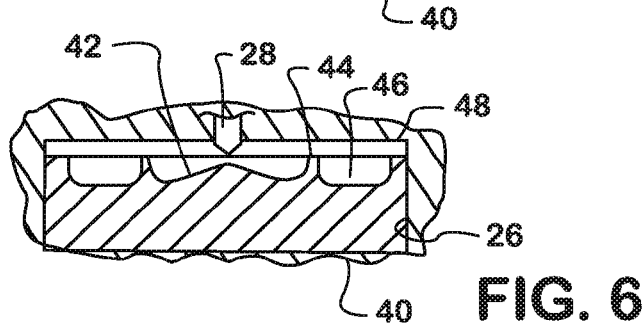

FIG. 6 shows the complete combustion of the premixed air-fuel charge of low reactivity fuel.

Figure 7:
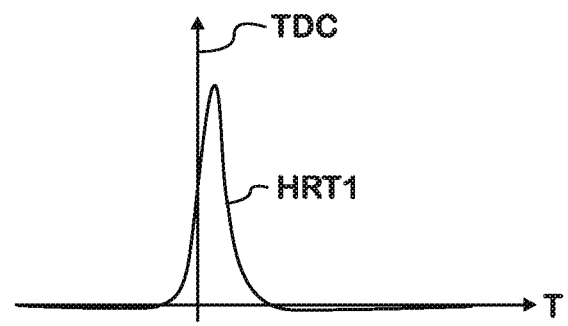
FIG. 7 is a representative graph plot which is presented for the purpose of characterizing the disclosed two-mode combustion process regardless of the specific structure used to perform it.
Figure 8:
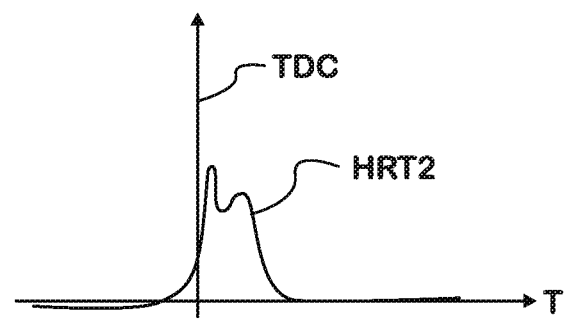
FIG. 8 is a graph plot presented for the purpose of comparison with the graph plot of FIG. 7.

FIG. 7 shows a representative heat release trace HRT1 as a function of time for a process which uses only a Premixed Charge Compression Ignition (PCCI) process while FIG. 8 shows a representative heat release trace HRT2 as a function of time for the two mode process disclosed here. TDC is marked in both Figures.

Comparison of FIG. 8 with FIG. 7 shows that the combustion energy is released over a longer time interval and with lower maximum pressure when the two mode process is used. The shape of the heat release rate trace can be adjusted to achieve a desired shape by varying certain parameters such as the quantity of exhaust gas being recirculated and the relative quantities of high reactivity fuel and low reactivity fuel. The process also limits the rate of change of in-cylinder pressure with crank angle (dP/dθ).

Figure 9:
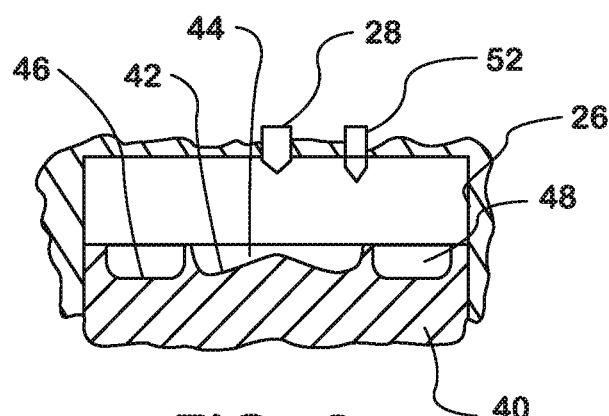
FIG. 9 shows an alternate embodiment.

FIG. 9 shows an alternate embodiment in which a second injector 52 is arranged to inject low reactivity fuel directly into the combustion chamber space of each engine cylinder 26. Such injectors 52 may be used in place of, or in association with, port injector 30. The timing of the direct injection of low reactivity fuel is timed such that a premixed air-fuel charge is created with or without stratification by the time that the injection of high reactivity fuel commences.

Figure 10:
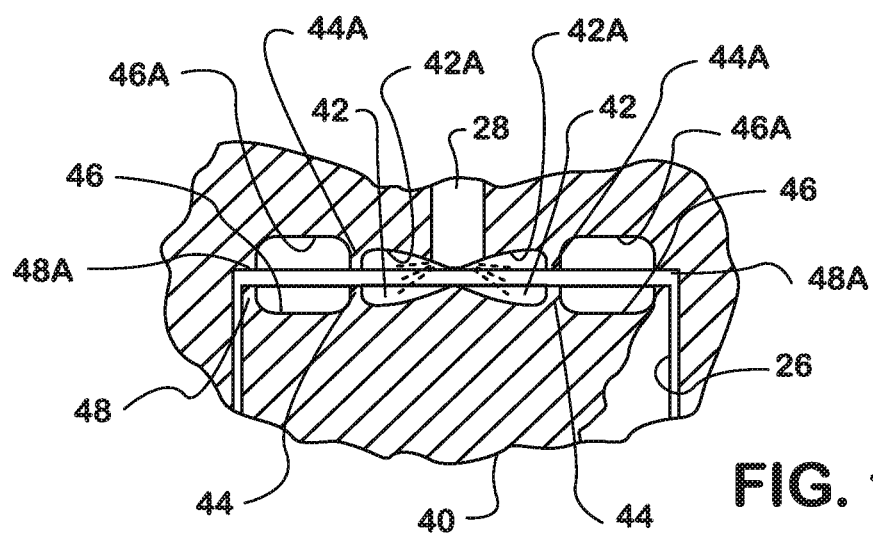
FIG. 10 shows another alternate embodiment.

FIG. 10 shows an embodiment in which the dual chamber bowl is cooperatively defined not only by circular central bowl cavity 42, circular upright intermediate wall 44, annular outer bowl cavity 46, and circular upright outer wall 48, but also by similar features in the inner end wall of engine cylinder 26. Those features include a circular central bowl cavity 42A confronting circular central bowl cavity 42, a circular upright intermediate wall 44A confronting circular upright intermediate wall 44, an annular outer bowl cavity 46A confronting annular outer bowl cavity 46, and a circular upright outer wall 48A confronting circular upright outer wall 48. The features in the inner end wall of engine cylinder 26 are an approximate mirror image of those in the head of piston 40.

Figure 11:
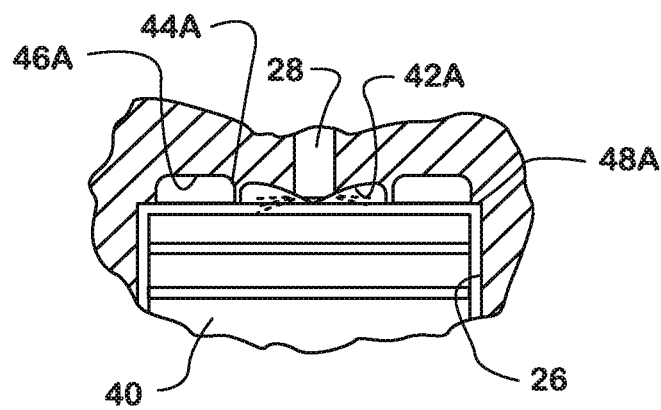
FIG. 11 shows another alternate embodiment.

FIG. 11 shows an embodiment in which the dual chamber bowl is cooperatively defined by circular central bowl cavity 42A, circular upright intermediate wall 44A, annular outer bowl cavity 46A, circular upright outer wall 48A, and a flat end surface of the head of piston 40.

Figure 12:
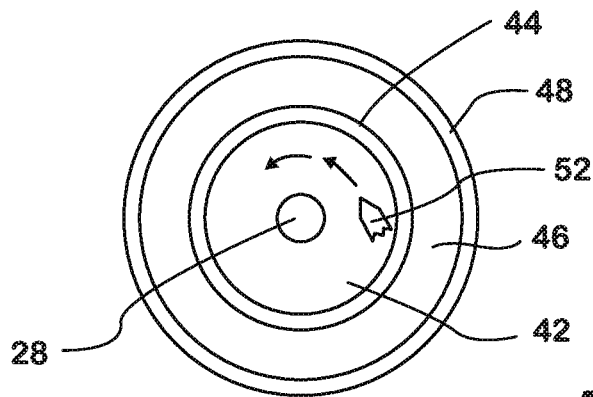
FIG. 12 shows another alternate embodiment.

FIG. 12 is an end view of piston 40 as the piston appears in FIG. 8. Injector 52 is arranged to impart a swirl component to the injection of low reactivity fuel. Swirl can enhance premixing of the injected fuel with air.

The invention claimed is:

1. A method of operating an internal combustion engine which has an engine cylinder, a piston which reciprocates within the engine cylinder and cooperates with the engine cylinder to form a combustion chamber space whose volume decreases as the piston moves inward within the engine cylinder and increases as the piston moves outward within the engine cylinder, the piston and the engine cylinder comprising confronting surfaces which, when the combustion chamber space closely approaches and finally attains minimum volume, cooperatively define a central bowl cavity which
 is radially bounded by an upright intermediate wall and an annular outer bowl cavity radially outward of the upright intermediate wall, and an intake system for introducing air into the combustion chamber space, the method comprising:
 injecting low reactivity fuel into the air to create within the combustion chamber space, a premixed air-fuel charge;
 when the combustion chamber space has attained substantially minimum volume, injecting high reactivity fuel directly into a central zone of the combustion chamber space which is bounded partially by the central bowl cavity and the upright intermediate wall to cause the high reactivity
 fuel to combust and create a flame front which propagates into an outer zone of the combustion chamber space which is bounded partially by the upright intermediate wall and the outer bowl cavity to initiate combustion of the premixed air-fuel charge in the outer zone of the combustion chamber space.

2. The method as set forth in claim 1 in which the step of injecting low reactivity fuel into the air comprises injecting low reactivity fuel into the air as the air passes through the intake system.

3. The method as set forth in claim 1 in which the step of injecting low reactivity fuel into the air comprises injecting low reactivity fuel into the air after the air has entered the engine cylinder.

4. The method as set forth in claim 1 including controlling timing of injecting the higher reactivity fuel to cause combustion of the premixed air-fuel charge to commence after TDC.

\* \* \* \* \*